US010172139B2

(12) United States Patent
Soysal et al.

(10) Patent No.: US 10,172,139 B2
(45) Date of Patent: Jan. 1, 2019

(54) ROUTING AND INTERFERENCE COORDINATION IN SELF-BACKHAULING WIRELESS MESH NETWORKS

(71) Applicant: ARGELA YAZILIM VE BILISIM TEKNOLOJILERI SAN. VE TIC. A.S., Istanbul (TR)

(72) Inventors: Akin Soysal, Istanbul (TR); Bengi Mizrahi, Istanbul (TR); Can Altay, Istanbul (TR); Erdogan Camcioglu, Istanbul (TR); Arda Akman, Istanbul (TR)

(73) Assignee: Argela Yazilim ve Bilisim Teknolojileri San. ve Tic. A.S. (TR)

( * ) Notice: Subject to any disclaimer, the term of this patent is extended or adjusted under 35 U.S.C. 154(b) by 156 days.

(21) Appl. No.: 15/250,891

(22) Filed: Aug. 29, 2016

(65) Prior Publication Data
US 2018/0063827 A1    Mar. 1, 2018

(51) Int. Cl.
| | |
|---|---|
| H04W 72/04 | (2009.01) |
| H04J 11/00 | (2006.01) |
| H04W 72/08 | (2009.01) |
| H04W 76/12 | (2018.01) |
| H04L 5/00 | (2006.01) |
| H04W 88/04 | (2009.01) |

(52) U.S. Cl.
CPC ....... *H04W 72/048* (2013.01); *H04J 11/0056* (2013.01); *H04L 5/0037* (2013.01); *H04W 72/0453* (2013.01); *H04W 72/087* (2013.01); *H04W 76/12* (2018.02); *H04W 88/04* (2013.01)

(58) Field of Classification Search
None
See application file for complete search history.

(56) References Cited

U.S. PATENT DOCUMENTS

| | | |
|---|---|---|
| 8,027,301 B2 | 9/2011 | Oyman et al. |
| 8,724,567 B2 | 5/2014 | Shin et al. |
| 2008/0144643 A1 | 6/2008 | Berg |

(Continued)

OTHER PUBLICATIONS

Thulasiraman et al., "Interference Aware Subcarrier Assignment for Throughput Maximization in OFDMA Wireless Relay Mesh Networks," IEEE International Conf. on Communications, Jun. 14-18, 2009, Dresden, Germany, 6pgs.

(Continued)

*Primary Examiner* — Christine T Duong
(74) *Attorney, Agent, or Firm* — IP Authority, LLC; Ramraj Soundararajan

(57) ABSTRACT

IP packets are routed across mesh and relay nodes in a wireless network via an IP tunnel that is established between a pair of mesh nodes terminating on the disclosed system, also referred to as Mesh App. The Mesh App has several key functions beyond terminating IP tunnels, such as: (1) collecting local wireless user equipment IP addresses from the local Core Network, (2) remote IP addresses and routing information from its neighbor Mesh Apps, and (3) routing user's data packets according to its routing table across the IP tunnel. This tunnel is simultaneously used as a control channel to allocate frequency sub-bands to backhaul and radio access user equipment across neighbor mesh nodes to minimize self-backhaul interference.

15 Claims, 10 Drawing Sheets

(56) References Cited

U.S. PATENT DOCUMENTS

| | | | | |
|---|---|---|---|---|
| 2011/0310758 A1* | 12/2011 | Tamaki | ............ | H04W 74/0808 |
| | | | | 370/252 |
| 2012/0114021 A1* | 5/2012 | Chung | .................. | H04B 7/155 |
| | | | | 375/211 |
| 2016/0255667 A1* | 9/2016 | Schwartz | ............ | H04W 76/12 |
| | | | | 455/445 |

OTHER PUBLICATIONS

Maeder et al., "OFDMA in the Field: Current and Future Challenges," ACM SIGCOMM Computer Communications Review, 40(5), Oct. 2010, 6pgs.

3rd Generation Partnership Project; Technical Specification Group Radio Access Network; Evolved Universal Terrestrial Radio Access Relay architectures for E-UTRA (LTE-Advanced)(Release 9), 3GPP TR 36.806, V9.0, Mar. 2010, 34 pgs.

Tseng et al., "A Study on Coverage Problem of Network Planning in LTE-Advanced Relay Networks," 2012 IEEE 26th International Conference on Advanced Information Networking and Applications, 2012 IEEE 26th International Conference on Advanced Information Networking and Applications, Fukuoka-shi, Japan, Mar. 26-29, 2012, 7pgs.

Al-Imari et al., Uplink Non-Orthogonal Multiple Access for 5G Wireless Networks, ISWCS 2014, Aug. 2014, 6pgs.

Kimura et al., "Inter-Cell Interference Coordination (ICIC)," Fujitsu Science Technical Journal, 48(1), Jan. 2012, 6pgs.

* cited by examiner

ROUTING AND INTERFERENCE COORDINATION IN SELF-BACKHAULING WIRELESS MESH NETWORKS

BACKGROUND OF THE INVENTION

Field of Invention

Aspects of the present disclosure relate to a self-backhauling mesh/relay system and method that is specifically designed for 4G and beyond technologies to coordinate and mitigate the self-interference between the backhaul User Equipment (UE) and the radio access UE(s) of the same network node, and also coordinate the interference between neighbor nodes by exchanging control messages.

Discussion of Related Art

Any discussion of the prior art throughout the specification should in no way be considered as an admission that such prior art is widely known or forms part of common general knowledge in the field.

In remote locations, where well-planned wireless infrastructure is not yet deployed, or when the base stations are moving as in military applications, bringing cellular communications service for data communications for everyday use or under emergency conditions using a well-established fixed core network infrastructure is difficult. In such areas, it is much easier to use wireless mesh networks wherein essentially base stations are directly interconnected with wireless/air interfaces to relay data traffic in a hop-by-hop fashion, since a backhaul infrastructure is not needed.

There are many alternative air interface technologies to use in wireless mesh networks. Orthogonal Frequency-Division Multiple Access (OFDMA) is one of the most popular air interface technologies for Wireless Mesh Networks because of its advantages in high data transmission rate, mitigation in frequency selectivity in multi-path environments, robustness against frequency selective fading, and ability to provide frequency diversity in multi-user environments (see paper to Thulasiraman et al. titled, "Interference Aware Subcarrier Assignment for Throughput Maximization in OFDMA Wireless Relay Mesh Networks," Communications, 2009. ICC '09.). Orthogonal Frequency Division Multiplexing (OFDM) in principle utilizes orthogonal subcarriers in frequency for data transmission. OFDMA uses OFDM to allocate a number of time and frequency resources to specific users (see paper to Maeder et al. titled, "OFDMA in the Field: Current and Future Challenges," Computer Communications Review, October 2010).

There are many other relay devices in the industry for OFDMA based networks. One of the most popular relays is the 3GPP compliant relay base station for LTE networks, which is also an OFDMA network ("3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806, V9.0.0, March 2010, 34 pgs.). In 3GPP standardization, relay base stations are considered as self-backhauling LTE base stations. According to the standards, a 'relay base station' is one that establishes a connection with a 'donor base station' (DN), which has a direct core network connection. In the LTE relay operations, the UE connects to a relay base station and the relay base station connects to a donor base station with a wireless link in a similar way a UE is connecting to a base station. In the wireless backhaul link, the donor base station is a base station and the relay base station acts as a UE, which is sometimes called a backhaul UE to distinguish it from the actual (user) UE. However, the standards support only one-hop relay (i.e., relay base station to donor base station), therefore it is not possible to create a network with several relay nodes forwarding data packets from one node to another up to a donor base station (see paper to Tseng et al. titled, "A Study on Coverage Problem of Network Planning in LTE-Advanced Relay Networks," presented at 2012 IEEE 26th International Conference on Advanced Information Networking and Applications, Fukuoka, March 2012).

Note that while OFDMA is currently the most popular multiple access technology of today, new multiple access schemes are in the horizon for new cellular technologies for 5G, including NOMA (see Al-Imari et al. titled, "Uplink Non-Orthogonal Multiple Access for 5G Wireless Networks," Conference: International Symposium on Wireless Communication Systems (ISWCS2014)). Therefore, this patent application is in no way limited to OFDMA technologies, but it is aimed for other advanced wireless technologies that are 4G and beyond.

In a wireless mesh or relay network comprising of nodes, which includes radio access UEs and the backhaul UEs in the same frequency bands, the performance is significantly reduced because of the so called 'self-interference' between the backhaul channel (i.e., the channel between the backhaul UE and the base station) and the radio access channel (i.e., the channel between the radio access UE and the base station), unless an interference coordination scheme is used. A variety of interference management techniques are applied to mitigate self-interference, ranging from assigning different time-slots, or time and frequency resources for transmissions, using antenna isolation techniques etc. However, when time resources are restricted, the required time pattern might differ from one technology to another considering retransmissions, multicast or bundling mechanisms and it would be hard to find a single timing pattern for all cellular technologies (see patent of Shin et al. titled, "Method and Apparatus Using Frame Structure For Wireless Mesh Networks," U.S. Pat. No. 8,724,567). Spatial multiplexing and antenna isolation are also challenging considering multi-path effects in urban scenarios.

In wireless mesh networks, interference occurs not only between backhaul and radio access users, but also between radio access users being served from neighboring base stations. There is an ongoing research on interference mitigation between neighboring nodes in wireless mesh networks with the help of message exchange between base stations to control Uplink (UL) and Downlink (DL) power and resource allocation (see Kimura et al. titled, "Inter-Cell Interference Coordination (ICIC)," FUJITSU Sci. Tech. J., January 2012). However, it is also necessary for the neighbor interference mitigation method of choice to work together with the self-interference mitigation method. Therefore, there is a need for a new neighbor interference mitigation method in wireless mesh networks.

Considering the performance degradation caused by backhaul and radio access interference, and the possibility of having cross-interference, a new interference mitigation method is proposed in our present invention, which departs from the designs of prior art since it proposes a simple and intuitive solution to it.

It is, therefore, an object of the present invention to provide an apparatus to make a high performance self-backhauling wireless mesh network possible. Since the self-backhaul users are going to create self-interference on the mobile (radio access) users, who are supposed to get the actual service, another object of the present invention is to provide a method or a collection of methods to prevent resource collisions between the self-backhaul users and radio access users.

Other object and advantages of the present invention are the introduction of a distributed neighbor interference mitigation technique that comprises control message exchange between adjacent mesh nodes as opposed to relaying on a centralized system.

Embodiments of the present invention are an improvement over prior art systems and methods.

SUMMARY OF THE INVENTION

The present invention provides a method and an apparatus for wireless communications that combine on a single interface across mesh nodes both data routing and the control messaging for resource allocation with interference mitigation to make data communications in wireless mesh networks more favorable. Advantageously, the methods provide a means to avoid or minimize collisions between the backhaul and radio access resources such that packet losses and retransmissions are avoided, thereby increasing both the overall system throughput and worst user throughput, and also increasing power savings.

Exchange of control messages between mesh nodes also provides advantage to coordinate between neighboring relay nodes to avoid physical resource collisions when considering that the backhaul access terminals would transmit with higher power in comparison to radio access terminals as they have a need for higher data demand because of carrying many radio access UEs' bundled traffic. Mitigating the collision of physical resources between the backhaul UEs among neighbor nodes would provide higher overall throughput, smaller backhaul delays, and more durable backhaul nodes, since less energy would be required to forward the same amount of traffic.

In one aspect, separating the physical resources between the backhaul and the radio access UEs would provide advantages over other methods like time division multiple access or spatial multiple access because no special frame patterns would need to be generated and no physical isolation between different types of nodes would be necessary. When time division multiple access is adopted, it would be necessary to create a frame pattern considering that technology specific time patterns for retransmissions, multi-cast, frame bundling mechanisms would still work. When a single frame pattern for all technologies is not possible, it would be necessary to create a separate pattern for each technology. In contrast, the allocation of different frequency sub-bands does not create any of the mentioned problems while making the estimation of data capacity of each partition easier, assuming that achievable data rate from each additional frequency sub-band within the frequency partition is the same.

In one aspect, the method would be used to mitigate interference in a dense or sparse network with mobile UEs. It would also be possible to use it in various topological formations including bus, star, ring etc. The source and destination devices are the mobile (radio access) user equipment that connect to the base stations. Some relay base stations with better channel conditions and located at the edge of the network would act as gateways to connect the users to Internet.

In another aspect of the present invention, the frequency sub-bands allocated to backhaul UE in a relay node will dynamically change depending on (i) different Quality of Service needs of mobile user applications, (ii) the number of mobile users connected to a relay node, or (iii) the location of the relay node in the network. Note that the location might impact a relay base station's demand for physical resources, e.g., if it is close to a base station that is attached to the Internet. The node may increase or decrease the amount of resources to be allocated to its own backhaul UEs and signal this information to its neighbors through exchange of pre-defined control messages according to this invention. Such flexibility would allow the relay base station to (i) prevent formation of bottlenecks in the backhaul, (ii) achieve more fairness in servicing throughout the network, and (iii) adapt to changes in distribution and density of radio access UEs over time.

In one embodiment, the present invention provides a first mesh application system located within a first, local, mesh node comprising: (a) a database storing: (1) routing information to route data packets of user equipment (LE) between the first, local, mesh node and a second, remote, mesh node via an IP tunnel, and (2) IP addresses associated with both local UEs associated with the first, local, mesh node and remote UEs associated with the second, remote, mesh node; and (b) an application to route the data packets and control traffic within the IP tunnel towards a second, remote, mesh application system associated with the remote, second, mesh node.

In another embodiment, the present invention discloses a method as implemented in a first mesh application system placed within a first mesh node of a wireless mesh network comprising: (a) forming an IP tunnel to at least a second mesh application system in a neighboring, second, mesh node using a wireless backhaul link, the IP tunnel provisioned to carry data and one or more control messages; (b) receiving IP addresses of UEs associated with the second mesh application system via the IP tunnel; (c) storing, at the first mesh node, received IP addresses in (b) associated with the second mesh application system along with IP addresses of UEs associated with the first mesh application system; (d) routing IP traffic between a first UE associated with the first mesh node and a second UE associated with the neighboring, second, mesh node via the IP tunnel; (e) exchanging the control messages between the first and second mesh application systems via a control channel within the IP tunnel to coordinate resource assignment to backhaul wireless link and UEs between the first and second mesh nodes; and wherein best available frequency bands are computed by the first mesh application system for its radio access and backhaul UEs if dynamic resource partitioning is active.

In yet another embodiment, the present invention provides a method to avoid physical resource collisions as implemented in a first mesh application system placed within a first mesh node of a wireless mesh network comprising: (a) forming an IP tunnel to at least a second mesh application system in a neighboring, second, mesh node using a wireless backhaul link, the IP tunnel provisioned to carry data and one or more control messages; (b) receiving IP addresses of UEs associated with the second mesh application system via the IP tunnel; (c) storing, at the first mesh node, received IP addresses in (b) associated with the second mesh application system along with IP addresses of UEs associated with the first mesh application system; (d) routing IP traffic between a first UE associated with the first mesh node and a second UE associated with the neighboring, second, mesh node via the IP tunnel; and (e) eliminating physical resource collisions by exchanging the control messages between the first and second mesh application systems via a control channel within the IP tunnel to coordinate resource assignment to backhaul wireless link and UEs between the first and second mesh nodes.

In another embodiment, the present invention discloses an article of manufacture comprising non-transitory computer storage medium storing computer readable program code which, when executed by a processor, implements a method as implemented in a first mesh application system placed within a first mesh node of a wireless mesh network comprising: (a) computer readable program code executed by the processor to form an IP tunnel to at least a second mesh application system in a neighboring, second, mesh node using a wireless backhaul link, the IP tunnel provisioned to carry data and one or more control messages; (b) computer readable program code executed by processor to receive IP addresses of UEs associated with the second mesh application system via the IP tunnel; (c) computer readable program code executed by processor to store, at the first mesh node, received IP addresses in (b) associated with the second mesh application system along with IP addresses of UEs associated with the first mesh application system; (d) computer readable program code executed by the processor to route IP traffic between a first UP associated with the first mesh node and a second UE associated with the neighboring, second, mesh node via the IP tunnel; (e) computer readable program code executed by the processor to exchange the control messages between the first and second mesh application systems via a control channel within the IP tunnel to coordinate resource assignment to backhaul wireless link and UEs between the first and second mesh nodes; and wherein best available frequency bands are computed by the first mesh application system for its radio access and backhaul UEs if dynamic resource partitioning is active.

In yet another embodiment, the present invention provides an article of manufacture comprising non-transitory computer storage medium storing computer readable program code which, when executed by a processor, implements a method to avoid physical resource collisions as implemented in a first mesh application system placed within a first mesh node of a wireless mesh network comprising: (a) computer readable program code executed by processor to form an IP tunnel to at least a second mesh application system in a neighboring, second, mesh node using a wireless backhaul link, the IP tunnel provisioned to carry data and one or more control messages; (b) computer readable program code executed by processor to receive IP addresses of UEs associated with the second mesh application system via the IP tunnel; (c) computer readable program code executed by processor to store, at the first mesh node, received IP addresses in (b) associated with the second mesh application system along with IP addresses of UEs associated with the first mesh application system; (d) computer readable program code executed by processor to route IP traffic between a first UE associated with the first mesh node and a second UE associated with the neighboring, second, mesh node via the IP tunnel; and (e) computer readable program code executed by processor to eliminate physical resource collisions by exchanging the control messages between the first and second mesh application systems via a control channel within the IP tunnel to coordinate resource assignment to backhaul wireless link and UEs between the first and second mesh nodes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, where a particular feature, structure, or characteristic is described in connection with an embodiment, it is submitted that it is within the knowledge of one skilled in the art to affect such feature, structure, or characteristic in connection with other embodiments whether or not explicitly described.

DESCRIPTION OF THE PREFERRED EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
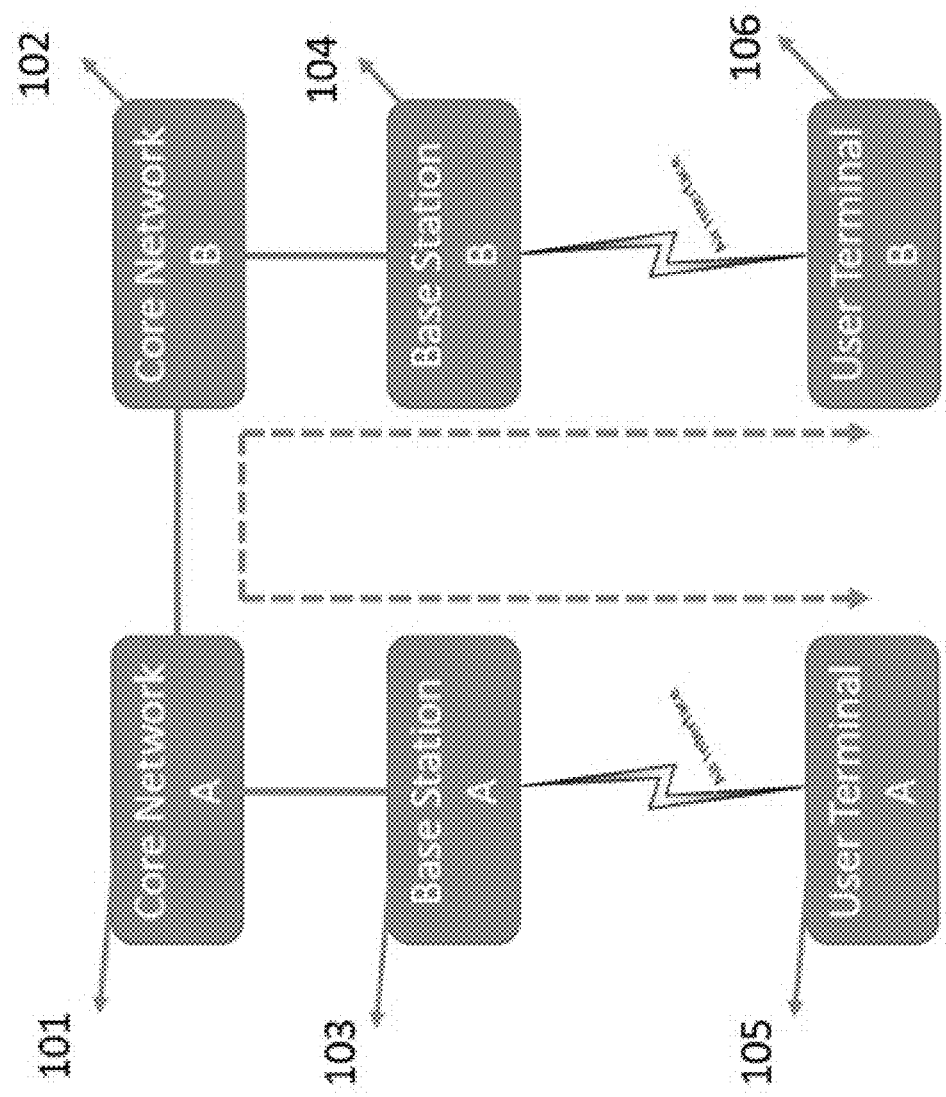
FIG. 1 depicts the entities included for data communication between two UEs in a conventional cellular network.

Cellular communication technologies usually require a high amount of infrastructure behind the base stations for routing and forwarding of packets to their destinations. In a traditional cellular deployment, as shown in FIG. 1, the UE A 105, wherein a UE is always a mobile equipment, connects through the air interface to Base Station A, 103, and registers to Core Network A, 101. The Core Network is also known in prior art as Packet Core Network (PCN). The Core Network is necessary for routing of data packets within and outside its coverage area. Although not shown in the diagram, Base Stations may interconnect to neighboring Base Stations with a cellular interface for mainly signaling and packet forwarding during handover. The Base Station and Core Network, together, is responsible for interference mitigation and coordination in case same frequency bands are used between neighboring base stations. When the UE A, 105, wants to send data packet to UE B, 106, it sends a request to Core Network A, 101. The Core Networks are responsible for session establishment and routing of packets. Once the session is established, the UE A, 105, can send packets traversing the path through Base Station A, 103, Core Network A, 101, Core Network B, 102, Base Station B, 104, to UE B, 106. Note that other than the air interface between the UEs and Base Stations, all other interfaces connecting entities in the network are all wireline. Furthermore, the locations of base stations and core network components are pre-planned.

Figure 2:
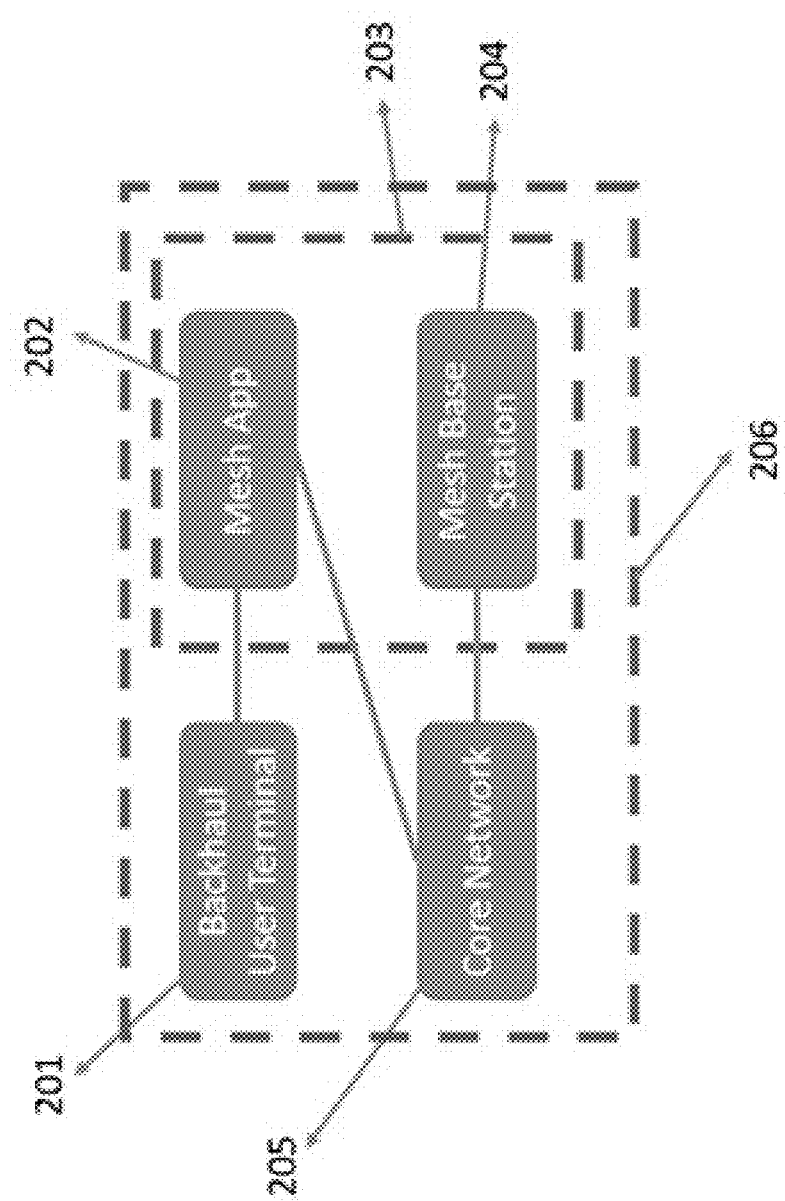
FIG. 2 depicts the contents of a Wireless Mesh Node, comprising of the prior art entities and the Mesh Software that is responsible for mesh operation according to an aspect of this invention.

According to one embodiment of the invention, an apparatus for wireless communication is provided which should allow hopping of packets from one node to another. An exemplary arrangement of the building blocks of an embodiment of the invention is shown in FIG. 2. Box 206 shows the enclosure of a so-called Mesh Node. While the Backhaul UE (or Backhaul User Equipment), 201, and the Core Network, 205, are entities that could be used directly from third parties, the Mesh App, 202, and the Mesh Base Station, 204, are special systems specific to this invention. These two systems are put further into another enclosure, 203, for clarification. Note that according to prior art, a mesh node comprises of a Mesh Base Station and a Backhaul UE and a Core Network only. Mesh Base Station, 204, of one mesh node connects to a Backhaul UE, 201 of another mesh node over the air interface to provide the backhauling of data traffic. However, a Backhaul UE, 201, is not allowed to connect to the Mesh Base Station, 204, of its own Mesh Node, 206.

Figure 3:
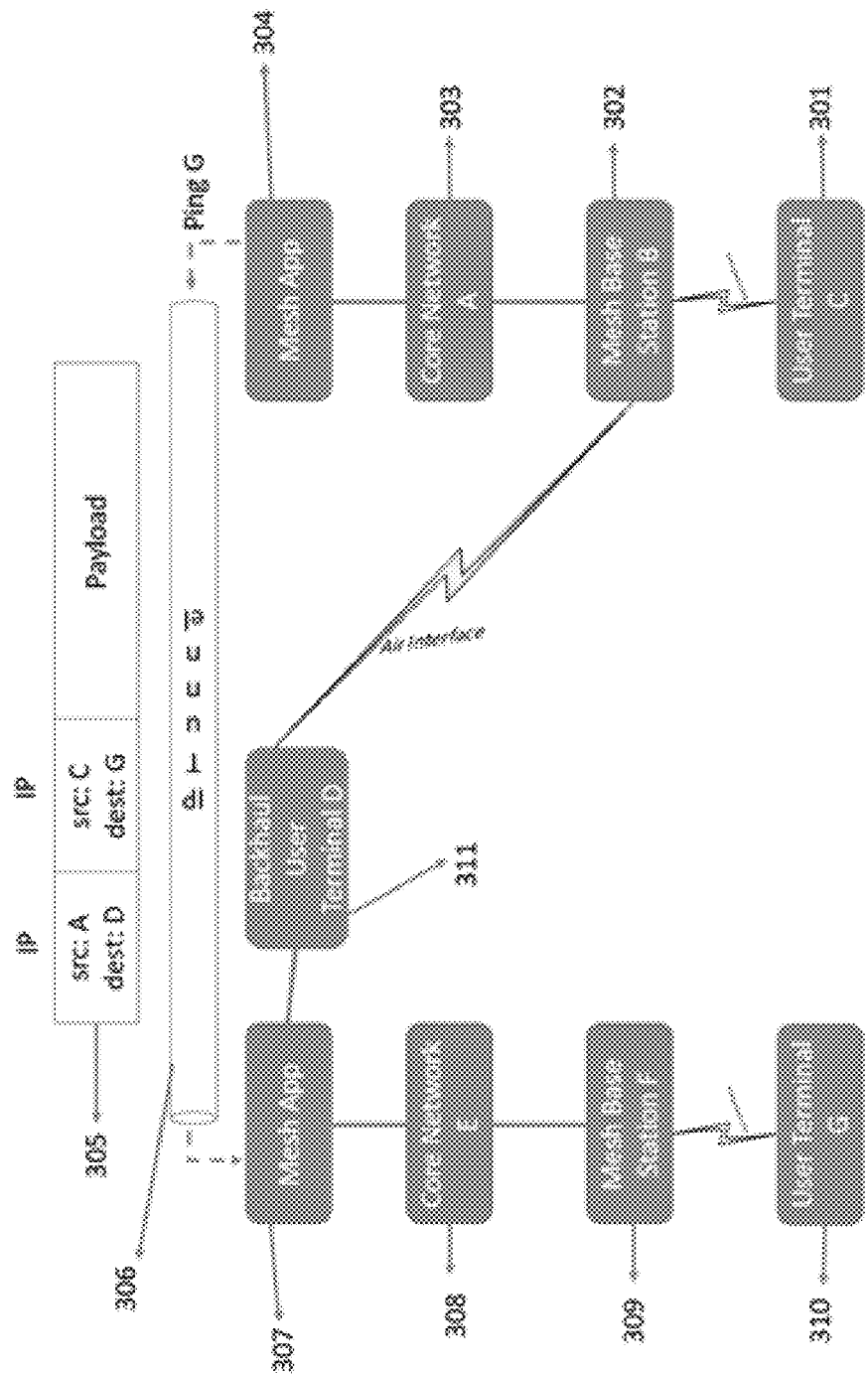
FIG. 3 shows an example for IP tunneling between two UEs within coverage of two different Mesh Nodes used for data transmission as well as control messaging.

FIG. 3 illustrates an example network with two Mesh Nodes per this invention. Radio Access UE 301 is attached to one mesh node in the network while Radio Access UE 310 is attached to another mesh node, and they communicate with one another using the backhaul radio connection. Because they are attached to different mesh nodes, the data traffic from UE 310 is first sent to Mesh Base Station 309 via the wireless access link. In turn the traffic is routed from Backhaul UE 311 via the backhaul wireless link to Mesh Base Station 302 and to the UE 301 therefrom.

When a radio access User Equipment (UE) is connected to a base station of a Mesh Node, it is registered in its Core Network, 205, as shown in FIG. 2. Namely, the UE acquires its IP address from that Core Network. Note that a backhaul UE registers with the Core Network of the adjacent Mesh Node (other Mesh Node it attaches to), whereas a radio access UE registers with the Core Network of the Mesh Node it directly attaches to. Using FIG. 3, UE 310 obtains its IP address from Core Network 308, while UE 301 and backhaul UE 311 obtain their IP addresses from Core Network 303. A Core Network obtains information about all UEs (both radio access of backhaul) from a Home Location Registrar (HLR) database within itself. This database in each Core Network contains the IMSI of each UE and the corresponding static and uniquely assigned IP address, which has to be preconfigured by the operator at the beginning of operation. Therefore, a Core Network knows all IP addresses used by radio access UEs attached to it. Note that for the packets of UEs to remain as unique within the Mesh Node, the Core Network has to disable Network Address Translation (NAT), so that the source and destination IP addresses remain as the original addresses and could be routed using the IP header of packets. The Core Network typically provides an interface so that the User Equipment (UE) specific Quality of Service (QoS) and other types of service parameters can be modified. These will be used for assignment of frequency sub-bands to UEs during scheduling within the base station per this invention.

The Mesh App:

In this section, we describe the role of Mesh App in establishing IP tunnels to Mesh Apps of other mesh nodes to
  (i) route data packets of radio access UEs across mesh nodes; and
  (ii) assign frequency bands to be used by radio access UEs and backhaul UEs to mitigate self-interference and communicate and negotiate with other Mesh Nodes about used physical resources when in dynamic operation. This dual role of routing and resource control of the Mesh App makes it an effective addition to any mesh node.

(i) Cross Mesh Node Routing Role:

The Mesh Apps, 304 and 307, per this invention are responsible for providing the inter-mesh node IP connectivity for data routing and control messaging, for assigning frequency sub-bands to backhaul to mitigate interference from frequency sub-bands used by attached UEs. The Mesh App either runs on the same computer with the Core Network or can be on a separate computer attached with a local area network to the Core Network's computer. The backhaul UE can be a simple interface card (such as a SIM card) on the computer that runs Core Network or the Mesh App.

Once turned on, each Mesh App detects the backhaul UE in the same node and makes sure that the detected backhaul UE connects to a remote Mesh Base Station, and not the local Mesh Node. The Core Network can be dynamically configured by the Mesh App or the configuration can be performed by the operator. Once the Mesh App detects that a connection has been established, it will form an IP tunnel in the uplink direction towards the Mesh App of the other node as illustrated in FIG. 3. Mesh App is further responsible for detecting if any backhaul UEs are connected to the Mesh Base Station within the same Mesh Node. If a backhaul UE's connection is detected, then another IP tunnel with this UE's Mesh App will be formed.

The Core Network knows the IP addresses of all Radio Access UEs and Backhaul UEs attached to itself through the registry process, and thus knows how to route data packets to destinations within the coverage of its collocated Mesh Base Station. However, it can't route IP traffic destined to radio access UEs attached to different mesh nodes. The Core Network continuously notifies the Mesh App of the 'Network Attach', 'Network Detach', and 'Handover' events to keep an accurate registry of all locally supported IP end points. Doing so, the Mesh App obtains all local IP addresses from the attached Core Network. Meanwhile, it learns the remote IP addresses from the Mesh Apps in other mesh nodes to be able to route packets beyond the coverage of its own Mesh Node. The neighbor Mesh Apps, therefore, periodically exchange control messages to obtain routing updates in the network. When a Mesh App receives a routing update control message from a peer Mesh App, it reads the content and updates its routing tables accordingly. When sending a routing update message, the Mesh App does not only include the reachability of its own radio access UEs within the Mesh Node coverage, but it includes its cumulative routing table that remains in the direction that is opposite to its transmission. In other words, if the Mesh App is sending the route update message in the up-link direction, it will include all IP addresses accessible to it in the downlink direction. The Mesh App will also advertise the number of hops necessary to reach each IP address. Thus, if there is more than one feasible route to reach a destination, the receiving Mesh App is supposed to optimize and decide the shortest routing path.

The Mesh App is further responsible to include the IP addresses of the neighbor Core Networks and Base Stations in its routing tables. The Core Network IP addresses will be necessary for handing over of radio access UEs between Mesh Nodes. Base Station IP addresses are included in case Base Stations need to communicate with each other for SON or other interference mitigation related features.

Each Mesh App is responsible for storing and updating of its routing table based on all this information. The Mesh App sniffs the packets arriving from an attached radio access UE, and based on the destination IP address of the incoming packets, it will either send the packets directly to the Core Network for a local transmission or tunnel it to send to a remote Mesh App.

In the preferred embodiment, establishment of IP tunnels and routing of packets across different mesh nodes have to be done by the Mesh App if two communicating radio access UEs are registered in different Core Networks. Routing is therefore a functionality of the Mesh App, 202, jointly with the Core Network. Specifically, the Mesh App is responsible for routing of packets whose destinations are beyond the coverage of its collocated Core Network while the Core Network is responsible to route packets within the coverage of its mesh node. To accomplish this, Mesh App, 202, sniffs packets coming from the backhaul UE, 201, and Core Network, 205. If the destination IP address could be found in Core Network's routing table and the UE happens to be registered currently in the Core Network in the same Mesh Node, nothing has to be done, meaning the Core Network will readily know how to directly route the packet to the correct UE. However, if the destination IP address is in another mesh node, the packet will be sent by the Core Network towards the Mesh App will route the packet towards either the backhaul UE to be forwarded to the Mesh Node in the up-link direction, or towards the backhaul UE connected to the collocated. Core Network in the down-link direction. Note that IP tunneling is required for these operations.

When a UE registers or de-registers from the Core Network or if there is a handover, a notification message is sent from the Core Network to the local Mesh App so that the Mesh App updates its local routing table accordingly. Mesh App also notifies other Mesh Apps in other Mesh Nodes about changes in its routing table. Note that Core Networks need to exchange messages during radio access UE handovers and base stations may need to exchange messages for other functional purposes as well. Since message exchange has to be through the backhaul IP tunnel over the air interface. Mesh Node needs to know not only the remote IP addresses of the radio Access UEs, but also the neighbor Core Networks and Mesh Base Stations.

The Mesh App can't route packets directly to the destination of the IP packet when the destination address is not within the coverage of the Mesh Node of that Mesh App because, the destination IP address of the packet is not known within the Mesh Node and it would not be sufficient to simply bypass the radio access network and the air interface. Therefore, it has to be tunneled across the two Mesh Nodes as shown in FIG. 3, wherein the source and destination Radio Access UEs are within the coverage areas of these two Mesh Nodes. In this example, Radio Access UE C, 301, is transmitting a ping packet to Radio Access UE G in another in Mesh Node, 310. The ping packet travels through the Mesh Base Station, 302, and arrives at the Core Network, 303. The destination IP address of UE G, 310, is not registered within Core Network A, 303. If the Mesh App was not deployed per this invention, the Core Network A, 303, would have discarded the ping packet since it is unaware of the fact that the destination is attached to a Core Network behind one of its registered UEs fulfilling the backhaul functionality. To bypass the air interface between the Mesh Base Station B, 302, and the Backhaul UE D, 311, IP tunneling between the Mesh App, 304, and Mesh App 307 is used. Before sending the packet on the IP tunnel, the Mesh App, 304, looks up its routing table to see that it could route the packet towards the destination through Mesh App, 307. Thereafter, the Mesh App 304 encapsulates the packet inside another packet with the destination IP address being that of the Backhaul User Equipment, 311, of the other Mesh Node. The structure of the formed packet is shown as 305. Core Network A, 303, routes the packet through Mesh Base Station B, 302, and to Backhaul UE D, 311. Mesh App, 307, sniffs the packet and strips off the outer tunnel header to see that the IP address of destination, is UE G, 310 which is within the coverage are of its Core Network E, 308. It sends it to Core Network E which routes the packet through Mesh Base Station F, 309, and to UE G, 310. Note that the reply of the ping packet to UE C, 301, is going to go through the same procedure in the reverse direction. This sequence clearly illustrates the key role of the Mesh App to route data packets across different mesh nodes.

Figure 4:
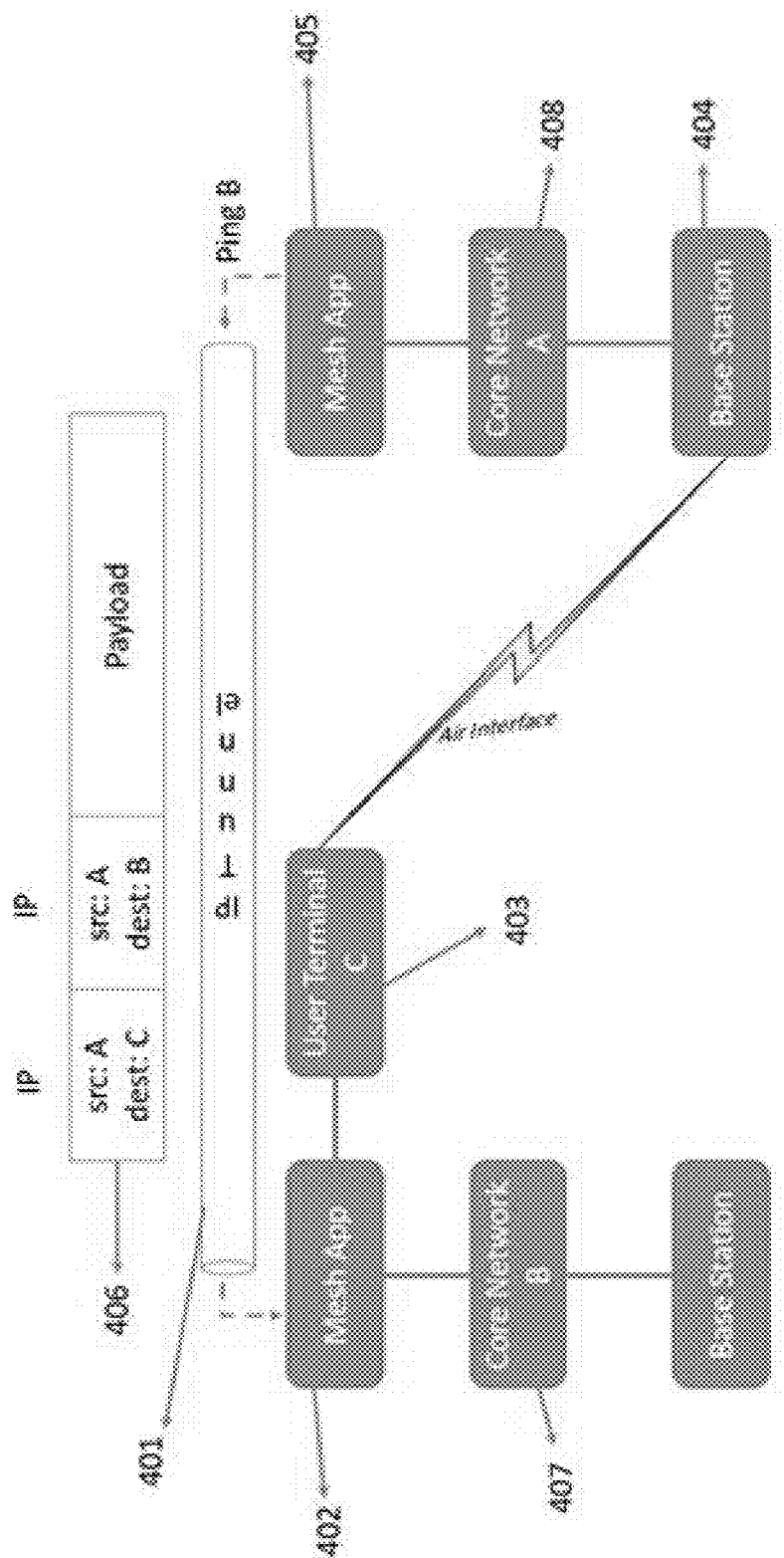
FIG. 4 shows an example for IP tunneling between two core networks.

In order to successfully complete handovers of Radio Access UEs between neighboring Mesh Nodes, the Core Networks in different Mesh Nodes also need to communicate with each other. Therefore, a ping scenario between Core Networks is shown in FIG. 4. In this scenario, Core Network A, 408, is sending a ping packet to Core Network B, 407. If the original source and destination of the ping packet were to remain the same, the packet would not bypass the air interface between the base station 404 and the Backhaul UE C 403, since the IP address of Core Network B, 407, is not known within Mesh Node A. For this scenario to work, the Mesh App, 405, will sniff the ping packet, look into its routing table, and if it exists, it will see that Core Network B, 407, is behind the backhaul UE C, 403. Thereafter, the ping packet will be encapsulated with the destination address of backhaul UE C, 403, within the Mesh App, 405. As a result, an IP packet encapsulated inside another IP packet, 406, is formed and sent over a virtual IP tunnel, 401, between Mesh App, 405, and Mesh App, 402. When the packet arrives at the Mesh App, 402, after it is received by the UE C, 403, the outer IP header will be stripped off and the Mesh App, 402, will transmit the packet to Core Network B, 407, which is the destination address.

(ii) Cross Mesh Node Resource Allocation Role:

The Mesh Base Station, 204, in FIG. 2, is a system of invention in the sense that it is able to group the UEs based on pre-determined service parameters and assign physical frequency sub-bands to them based on a parameter class. The resource partitioning could be static or dynamic based on operator's preference.

Figure 5:
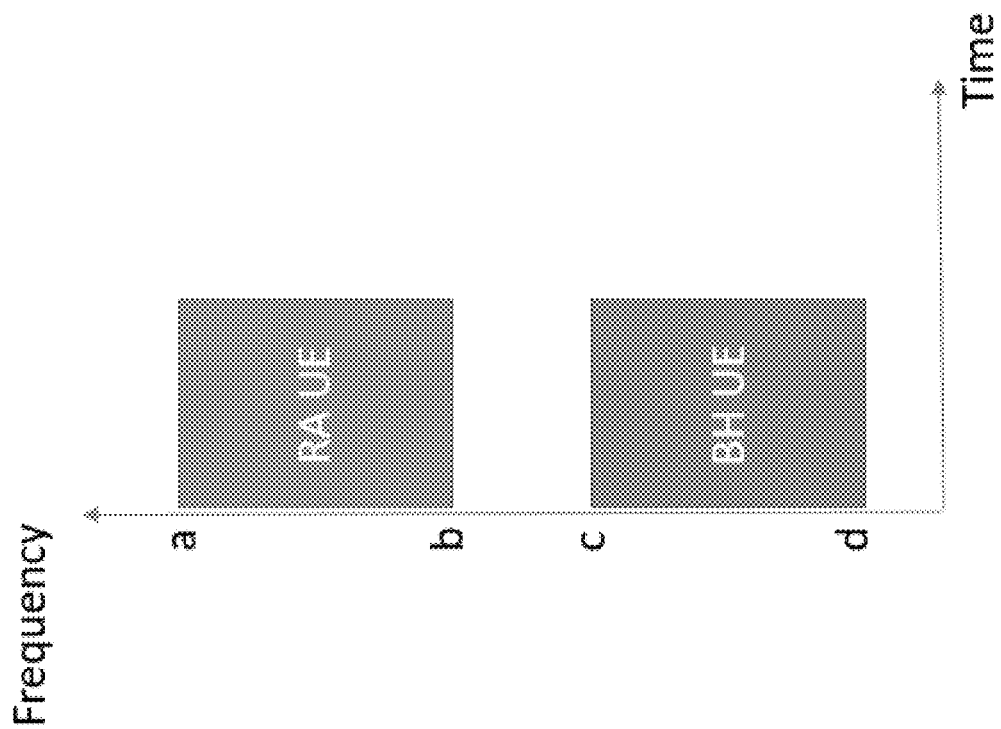
FIG. 5 shows an exemplary method for partitioning the available bandwidth between the backhaul and radio access UEs.

A simple static resource partitioning method between the backhaul and radio access UEs is shown in FIG. 5. Note that the band region shown in FIG. 5 is the same for both uplink and downlink directions, since this patent is specifically designed for full duplex FDD (Frequency Division Duplex) systems. In this arrangement, carrier frequencies for uplink and downlink are the same for among all Mesh Base Stations and among all UEs. Although OFDM and other technologies like NOMA allows sharing of time resources as well as frequency resources, the sharing of time resources is not applied, since design of a complex timing frame pattern would be necessary.

In a scenario where the Mesh Nodes are not highly mobile, the frequency sub-bands might be statically assigned to each Mesh Node. A key aspect is that the frequency sub-bands reserved for backhaul should not be intersecting across neighbor nodes because if the backhaul UE connects to a neighbor using the same band, it would experience a high interference from its own base station. However, radio access sub-bands may be used in a Reuse-1 fashion. Once the radio access sub-bands are determined, the rest of the band can be divided into 2, 3, or more bands to apply Reuse-2, Reuse-3, or higher reuse schemes, respectively, to be assigned to backhaul UEs. Note that a, b, c, d limits in FIG. 5 can take different values across the available frequency spectrum.

In the case of static resource partitioning, the frequency sub-band regions for radio access and backhaul users need to be determined by operator. The operator programs the Mesh App and in turn the Mesh App may program the collocated Base Station regarding the usable frequency bands or instead the operator may directly program the base station.

Figure 6:
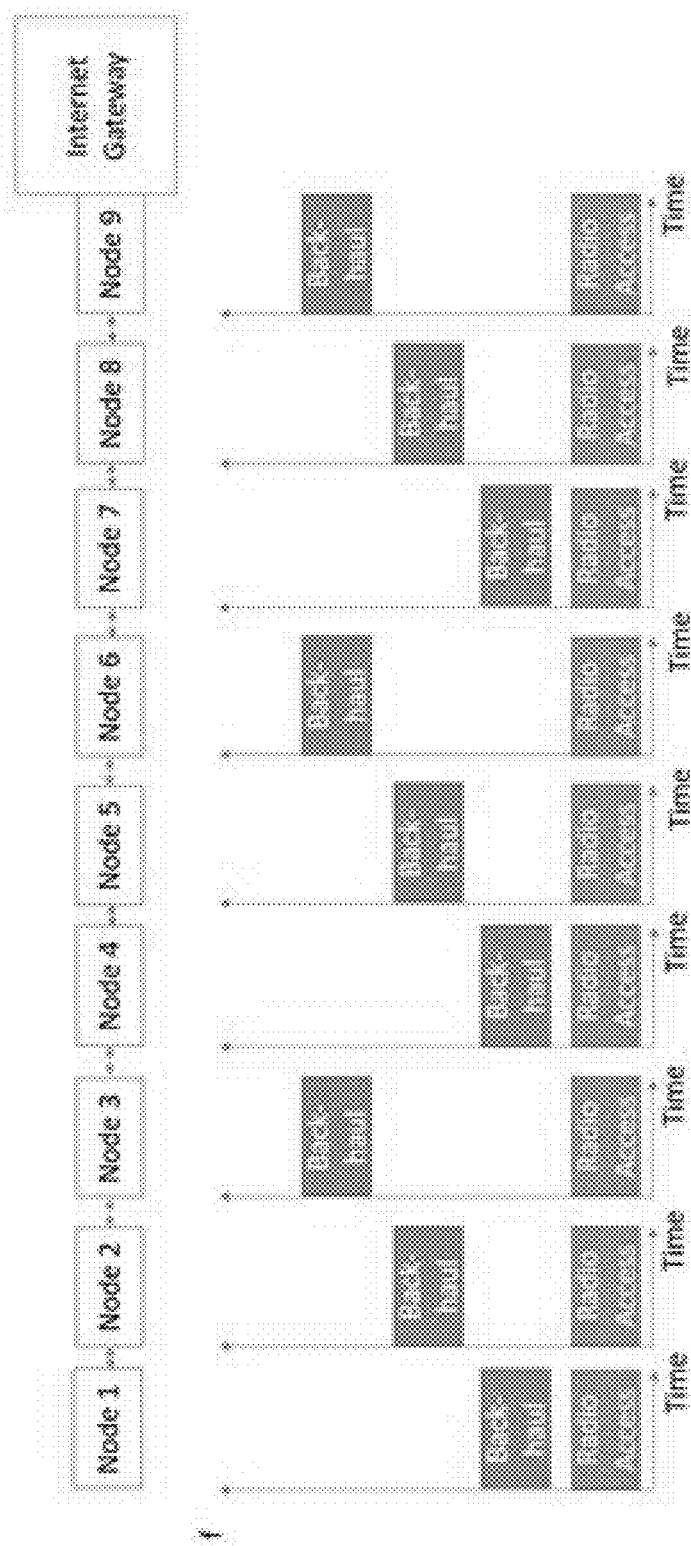
FIG. 6 shows and exemplary frequency partitioning for a linear network topology.

A simple linear mesh node topology with 9 Mesh Nodes and an Internet Gateway connected to Node 9 is shown in FIG. 6. In the case of static resource partitioning, linear topology is the easiest to apply, since it is easy to determine the nodes that would create interference on each other. In this example, Reuse-3 for Backhaul resources and Reuse-1 for Radio Access resources have been shown. Only the down-link or the up-link spectrum is shown, since in full duplex frequency division duplex (FDD) the downlink and uplink are symmetrical in many cellular technologies. When doing the planning, the operator has to make sure that the radio access and the backhaul sub-bands do not intersect. Reuse-3 has been applied within backhaul resources to avoid interference between neighbor nodes, but any scheme higher than Reuse-3 can also be used depending on the topology. A scheme higher than Reuse-1 can also be used for Radio Access UEs.

Once the frequency bands are determined, it would be necessary for the Mesh Base Station to assign radio access and backhaul UEs the corresponding sub-bands. First, the UEs would be differentiated as backhaul or radio access. The separation may be achieved parametrically within the Core Network, or by simply assigning different Quality of Service (QoS) to different groups of UEs. Note that the Operator has to pre-configure same parameters over all Core Networks so that the quality of provided service to each UE does not change throughout the whole network. Since the backhaul UEs would generate much higher traffic volumes (due to traffic aggregation across mesh nodes), they might be prioritized in terms of QoS over radio access UEs.

In addition to the static resource partitioning, it is also possible to use dynamic resource partitioning by allowing the mesh nodes to exchange messages about their assignment of sub-bands to two different groups of UEs using the tunnel between the Mesh Apps. The Mesh Apps determine the frequency sub-bands to be used by each Mesh Node. The frequency sub-band regions can have equal size. Some mesh nodes may need to use larger sub-band regions, though, because of high number of UEs, large traffic volumes, or proximity to an Internet Gateway.

In order to select the band to be used for its backhaul UE in dynamic resource partitioning, the Mesh Apps exchange resource allocation in a control message. The Mesh Apps would transmit this message to all of its neighbors periodically. There has to be a nomenclature understood by all mesh nodes as to the notation of frequency sub-band assignments. For example, an integer number can be assigned to each sub-band region, wherein that smallest integer number indicates the lowest sub-band region, and increments by 1 for each upper sub-band. When the mesh node sends a control message with that sub-band's number, it indicates that the corresponding sub-band is used for the backhaul UEs. If more than one region is used, as in some mesh nodes that require more backhaul resources, then the numbers corresponding to all regions are sent. Alternatively, a binary bitmap can be used wherein each bit represents a single sub-band. If a bit in the bitmap is set to "1", it signals the neighbors that this specific base station is using the corresponding sub-band for its backhaul UE. Once each Mesh App receives the bitmap reports from its neighbors, it would search for a region of all "0"s and assign this specific region to its backhaul UEs to avoid any collisions with neighbors. There may be other efficient methods of signaling the sub-band assignment without sending the actual frequency. The channel numbering and binary bitmap approaches are just examples.

The same frequency assignment shown in FIG. 6 can be achieved by dynamic resource partitioning. Assuming that number of frequency sub-bands is the same for all Mesh Nodes, and the sequence of triggering for the determination of the sub-bands is in the direction from Node 1 to 9. Reuse-3 for backhaul resources is applied within a bandwidth of 3 sub-bands, the bitmap for Node 1 would be "001", since it is the first triggered node. The Mesh Node 1 would transmit this bitmap to its neighbor Node 2 only, since it is the only neighbor. Then Mesh Node 2 would wake up and it is notified by the resource allocation message from Node 1 that the first sub-band is used by Node 1. It then allocates the next available band and forms the bitmap "010". However, if Node 2 transmits its bitmap only to Node 3, Node 3 would allocate the same band as Node 1, which is "100". In this case, Node 2 would face direct interference from Node 3, while it is receiving from Node 1. Therefore, (i) the resource allocation updates need to travel always in one direction, i.e., either up-link or down-link, and (ii) the nodes need to also forward the frequency bitmap of the previous node. Based on this implementation, Node 2 would transmit its own bitmap "010" along with the bitmap of Node 1, which is "100", to Node 3. Node 3 would then allocate "001" to itself, since this is the only free band. When transmitting to Node 4, Node 3 would transmit its own bitmap "001" along with the bitmap of its immediate neighbor Node 2, i.e., "010". Node 4 would get band 1 with bitmap "100", and this process would propagate over the whole network.

Since the message exchange for resource allocation on the control channel will always be in a single direction, possible resource partitioning collisions in case of link failures or addition of new nodes will be fixed within the next cycle, since the new update message will overwrite the previously allocated resource band. In FIG. 6, if Node 3 fails, and Node 4 connects to Node 2, it will get the bitmaps of Node 2, "010", and Node 1, "100" and it will change its own bitmap to "001". So Node 4 immediately replaces the failed Node 3 and this change will propagate to all nodes up to Node 9.

Not all Mesh Nodes are created equal. One Mesh Node may need more resources than others and/or may require prioritization. For example, a sink node may require prioritization because it provides Internet connection and therefore most of the traffic gets concentrated around it. In other cases, number of radio access UEs connected to a specific Mesh Node would be much higher than others, or its coverage area would be large. Therefore, Mesh Apps may further need to exchange messages to ask for higher number of sub-bands for their radio access or backhaul UEs. In order to increase or decrease the number of sub-bands, empty sub-band regions between the backhaul resources should be left. When a Mesh Node needs more sub-bands, it will signal this request via bitmaps to its neighbors and allocate more sub-bands for backhaul based on a pre-defined criteria. In summary, the Mesh App will include all or a part of the following information in its resource allocation control message:

A bitmap of assigned sub-bands to backhaul UEs from the reserved band
A bitmap of assigned sub-bands to radio access UEs
Number of radio access UEs (optional)
Total average traffic volume (optional)
Traffic priority class (optional)
Number of hops to reach the Internet Gateway (optional)

In US patent application 20080144643 A1, Berg suggests a method for providing two transmission bands for simultaneous communication of signals by a plurality of mesh nodes of a mesh network by dividing both of the transmission bands into at least three subchannel regions (a total of 6 subchannels), and allocating at least four of these subchannel regions to each mesh node of the plurality of mesh nodes for use in transmission and reception, wherein the transmission and reception are allocated to subchannel regions of different transmission bands. Although this patent application suggests a mostly static partitioning of frequency subchannels in the transmit and receive directions, it does not provide a method by which these assignments can be modified dynamically though control signaling between mesh nodes, which is a key teaching of our patent. Since we are using two completely separate bands for transmissions in uplink and downlink, and a mesh node can use a specific sub-band only for downlink or uplink, which is full duplex FDD operation, our method is differentiated from their patent application, which is Half Duplex FDD. This patent application would also necessitate a different transceiver or an apparatus, where radios of different Mesh Nodes would have to use downlink and uplink bands interchangeably. Furthermore, the system of our patent provides a dual role of routing traffic across mesh nodes while using the same means to negotiate sub-band assignment through control messaging.

In U.S. Pat. No. 8,027,301 B2, Oyman et. al. describes a special type of cooperative OFDMA system wherein the time-frequency-power resources of a channel used by a mobile source device for transmission of data from that source to a fixed (non-mobile) destination is determined by a feedback received from the destination via a pilot channel towards that source. Although, there is a method for determining OFDMA resources dynamically, this patent does not teach how to route packets across mesh nodes and systematically divide the frequency spectrum across multiple neighboring mesh nodes. In addition, this patent allocates resources based on the requests from source and destination devices, where cooperative relay devices, or mesh nodes in our terminology, do not have resources allocated to themselves. On the contrary, resources are partitioned and reserved for each mesh node according to our patent. Oyman et al. also requires time synchronization, since transmission from one entity has to be forwarded within the next time slot to the next entity, because their relay devices do not have any resources allocated to themselves. In a similar U.S. Pat. No. 8,027,301 B2, Oyman et al. describe the resource allocation in a centralized manner by the base station. On the contrary, our work is performing resource partitioning by communication through a control channel in a completely distributed way between mesh nodes without requiring any centralized entity.

Figure 7A:
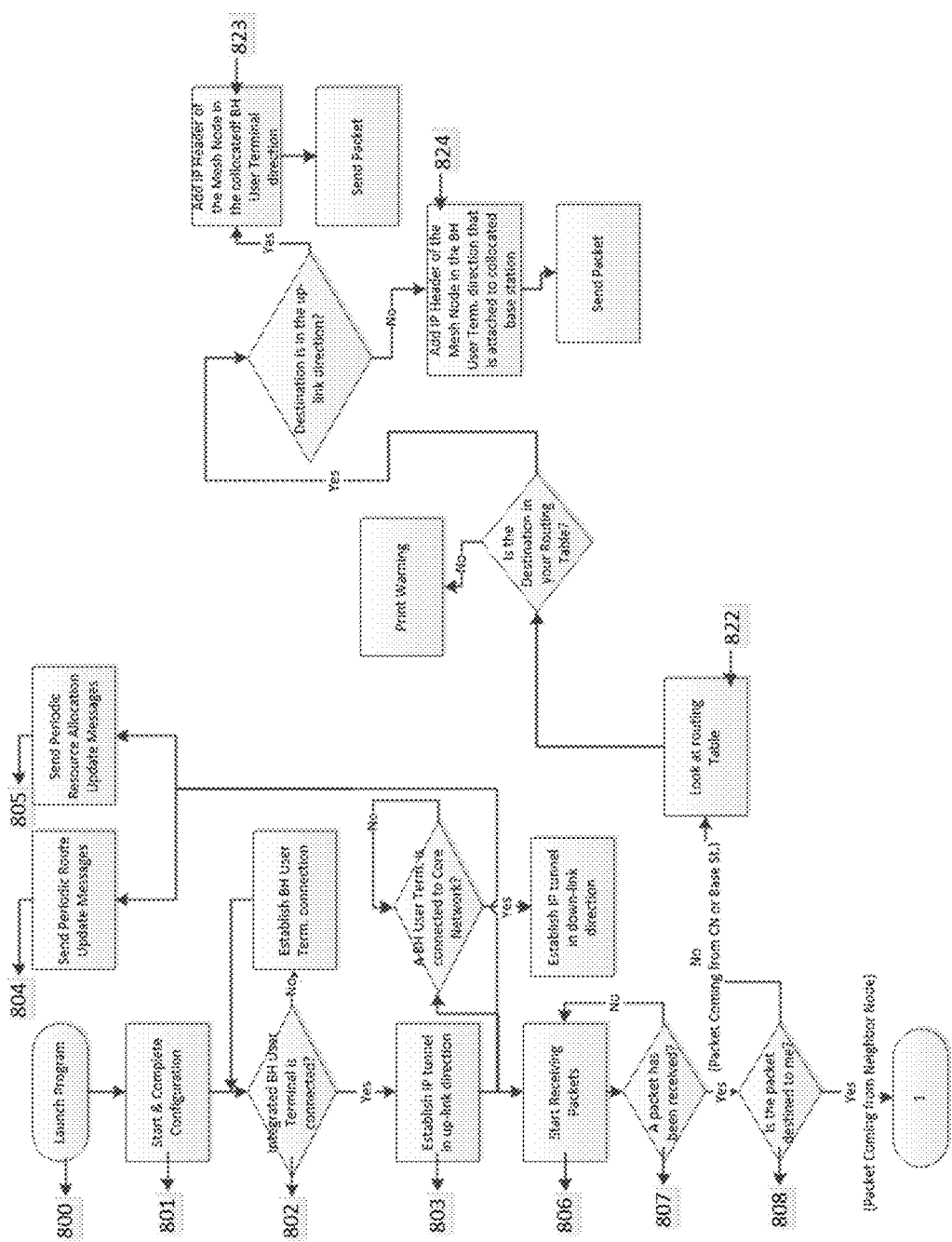
FIGS. 7A and 7B show the flowchart of the method of invention.
Figure 7B:
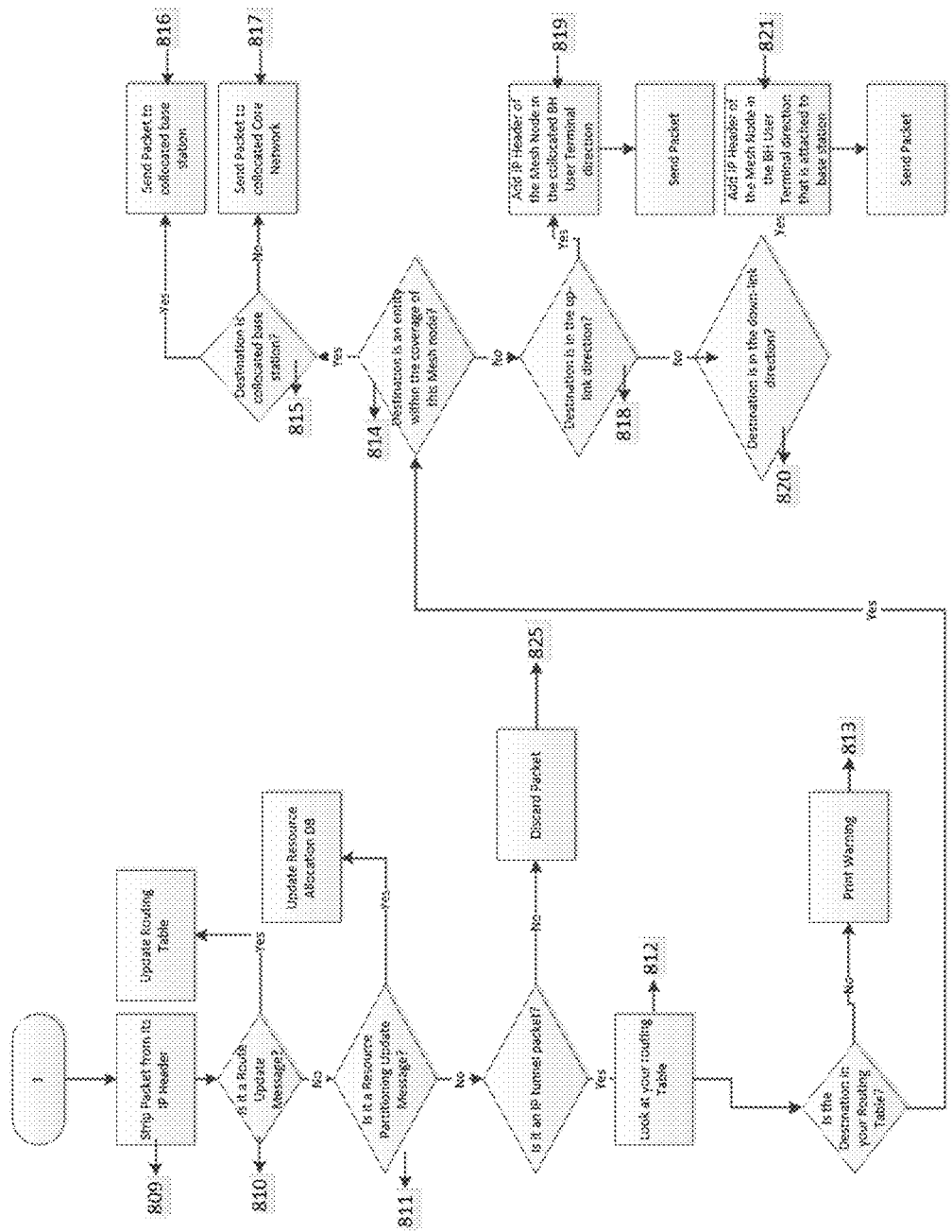

A flowchart showing the operations of the Mesh App is given in FIG. 7A and FIG. 7B. After its launch, the Mesh App is configured, in step 801, with its initial parameters, such as node identity, internal IP addresses etc. Then, it searches for an integrated backhaul UE and if it can find it, it will try to attach it to another Mesh Node until the process is successful, in step 802. Thereafter, Mesh App forms an IP tunnel in the up-link direction to start communication, in step 803. Once the first connection has been established, the Mesh App can start communicating with its first remote Mesh App and it can start sending periodic Route Updates in the IP tunnel, in step 804, and simultaneously Resource Allocation Update in the control channel, in step 805. Then in the down-link direction, it checks to determine if there are any backhaul UEs attached to the network and forms an IP tunnel if it finds one.

In step 806, it starts listening and receiving packets on its available interfaces. Once the Mesh App receives a packet in step 807, and if the destination address is its collocated Core Network, it knows that the packet is destined to its node. It might also happen that the packet is not a tunneled IP packet, e.g., the collocated Mesh Base Station tries to send a direct packet to the Core Network. In this case, the IP header will be discarded in step 825. If the packet is coming from a remote Mesh App, the IP tunnel header will be stripped off in step 809, and the contents will be read. If it is a Routing Update message, in step 810, or a Resource Partitioning Update message, in step 811, the Mesh App will store the incoming information in is database. If the incoming message is neither a Routing Update nor a Resource Partitioning Update message, then it is an actual data packet. At the next step, the Mesh App reads the original IP header and looks up its routing table, in step 812, and if it cannot find the routing information, then it gives a warning in step 813.

If the destination IP address is found in the routing table, the Mesh App first determines if the destination is within the coverage of its own Mesh Node, in step 814. If the destination is indeed within the coverage of the Mesh Node, Mesh App checks to determine if the destination address is a collocated base station. In this case, it has to transmit the packet directly to the base station, in step 816. Otherwise, it sends the packet to the collocated Core Network, in step 817, since the packet is targeted to a UE and the Core Network knows how to forward it.

If the destination IP address is not within the coverage of the Mesh Node, then the packet will either be sent in the up-link direction, in step 818, or in the down-link direction, in step 820. In that case, the packet will be encapsulated with the additional IP tunnel header and sent over one of these IP tunnels to bypass the air interface. As per check-box 808, if the packet is not destined to the Mesh App, then the packet is not coming from an IP tunnel but from the collocated Core Network or the base station targeted for a remote IP address and it has to be sent to a remote Mesh App for routing Mesh App checks its Routing Table, in step 822, and if the destination is in the routing table, the packet will either be sent in the tunnel in the up-link direction, in step 823, or in the downlink direction, in step 824 depending on the routing instruction in the table.

Figure 8:
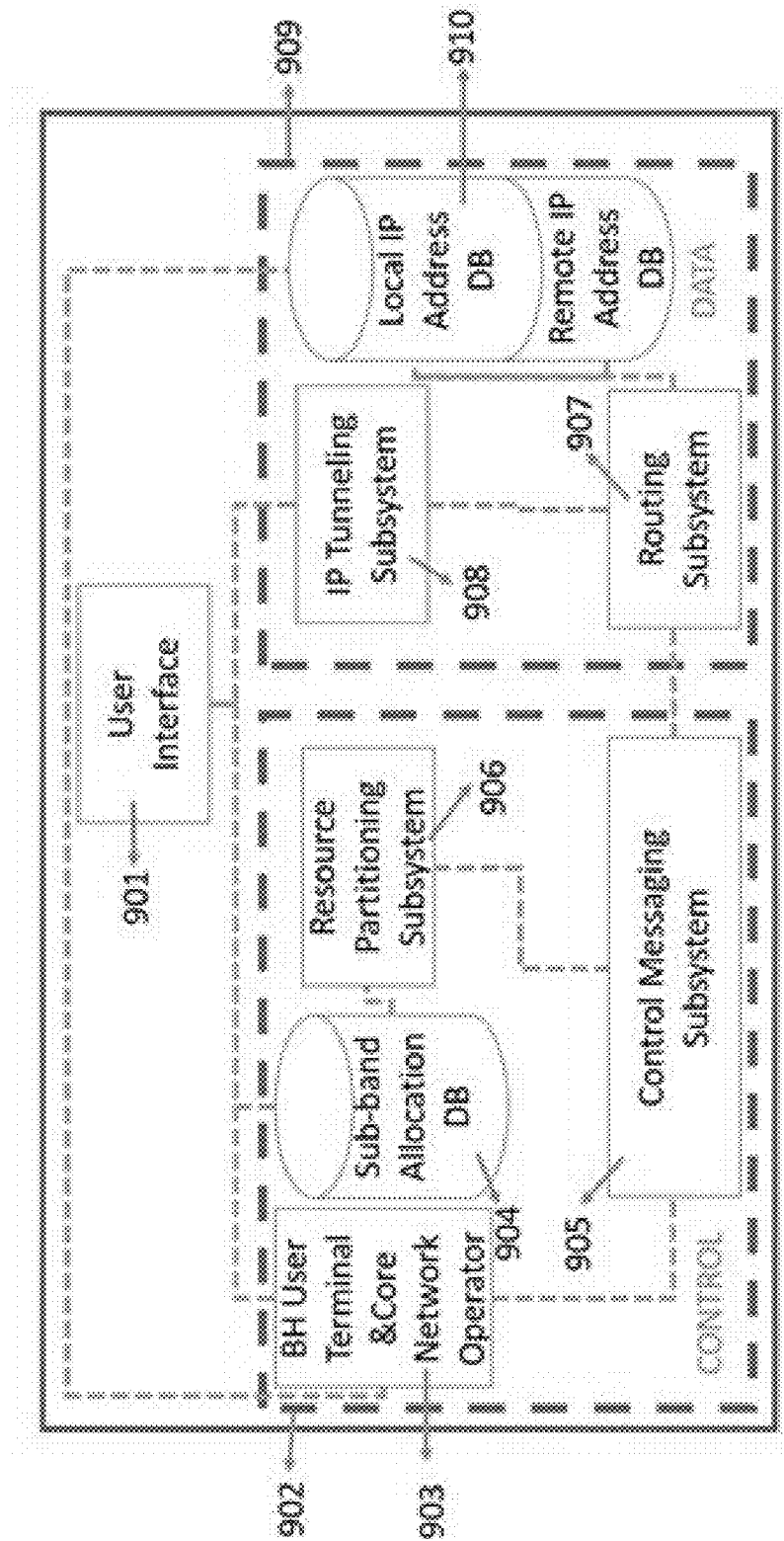
FIG. 8 shows the block diagram of the Mesh App per invention.
Figure 9:
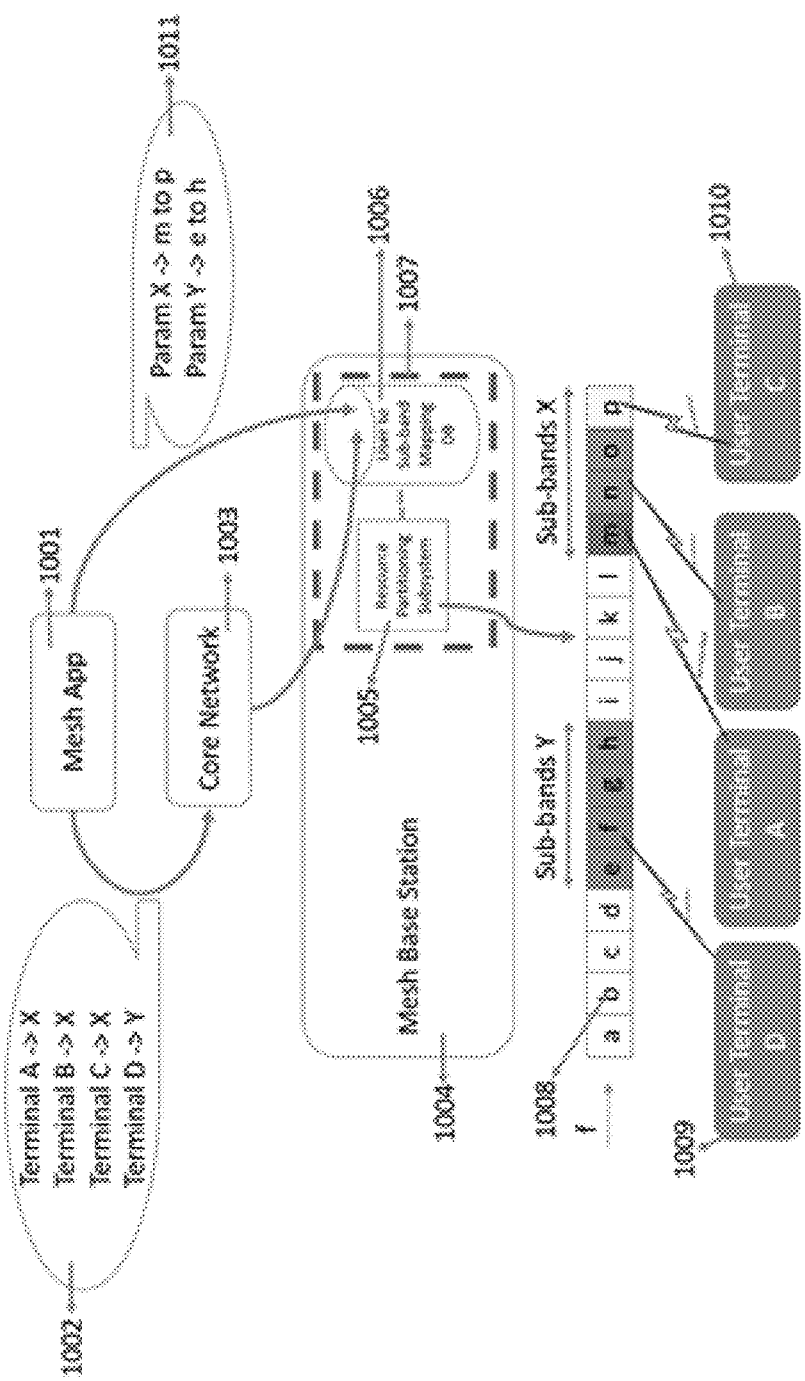
FIG. 9 shows the block diagram of Base Station per invention.

A simple block diagram of the Mesh App is illustrated in FIG. 8. The Mesh App has two main blocks, which are Data subsystem, 909, and Control subsystem, 902. Control subsystem, 902, is responsible for preparation of control messages for resource partitioning and for correct operation of connection establishment through its interface to other entities such as backhaul UE and collocated core network. Sub-band Allocation DB, 904, includes the mappings for sub-band regions to UE specific parameters and the sub-band bitmaps advertised from remote Mesh Apps. Resource partitioning subsystem, 906, reads the sub-band to UE specific parameter mappings and configures the base station, accordingly. It further reads the resource bitmaps of remote Mesh Apps from Sub-band Allocation DB, 904, and prepares periodic resource bitmap advertisements to remote Mesh Apps. The Backhaul UE and Core Network Operator, 903, are responsible for communicating with collocated entities within the Mesh Node and correct connection establishment for backhaul. It communicates with the collocated backhaul UE to establish a connection in the up-link direction. It communicates with the Core Network to assign different UE specific parameters to change resource partitions for backhaul and radio access whenever necessary. This entity is also responsible for updating the Local and Remote IP Address Database, 910, about the network attach, detach, and handover event notifications from the Core Network. Data subsystem, 903, is necessary for correct routing of incoming messages and formation of IP tunnels. Local and Remote IP addresses are stored within databases, 910, and Routing Subsystem, 907, checks the database regularly about the location of entities within the network. The Routing Subsystem, 907, and IP Tunneling Subsystem, 908, work closely to route packets that are destined to remote Mesh Apps. The Routing Subsystem, 907, sends periodic route update messages to remote Mesh Apps to keep their routing table up-to-date. Within the Mesh App, a User Interface, 901, is available to configure the control, 902, and data, 909, subsystems. The user will be able to change resource partitions methods, apply dynamic or static resource allocation;

change UE specific parameters through the interface to backhaul UE and Core Network Operator, 903;

configure the Mesh Node identity, IP addresses and tunnel end points

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective Routing and Interference Coordination in Self-Backhauling Wireless Mesh Networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A first mesh application system located within a first, local, mesh node comprising:
   a. a database storing: (1) routing information to route data packets of user equipment (UE) between the first, local, mesh node and a second, remote, mesh node via an IP tunnel, (2) IP addresses associated with both local UEs associated with the first, local, mesh node and remote UEs associated with the second, remote, mesh node, the second, remote, mesh node associated with a second mesh application system; (3) UE service parameters, and (4) a sub-band allocation database storing physical frequency sub-bands used by both local UEs associated with the first local, mesh node and remote UEs associated with the second, remote, mesh node; and
   b. a processor executing computer readable program code stored in computer memory to implement an application to: (1) exchange data packets and control messages within the IP tunnel with the second, remote, mesh application system associated with the remote, second, mesh node, (2) periodically exchange resource allocation update control messages between the first and second mesh application systems within the IP tunnel to coordinate resource assignment to radio access UEs and backhaul UEs between the first and second mesh nodes, and (3) give periodical decisions on assignment of frequency sub-bands to radio access UEs of the first, local, mesh node not reserved/used for backhaul UEs and not assigned to radio access UEs of the second mesh node, and (4) give periodical decisions on assignment of frequency sub-bands to backhaul UEs based on combination/summary of messages received from the second, remote mesh node by avoiding in-use backhaul frequency sub-bands.

2. The mesh application system of claim 1, wherein a mesh base station within the first, local, mesh node of the first mesh application system is programmed to:
   a. distinguish between backhaul and radio-access UEs based on their predefined parameters; and
   b. assign different uplink and downlink frequency sub-bands to different groups of UEs based on their predefined parameters per mesh application's request.

3. A method as implemented in a first mesh application system placed within a first mesh node of a wireless mesh network comprising:
   a. forming an IP tunnel to at least a second mesh application system in a neighboring, second, mesh node using a wireless backhaul link, the IP tunnel provisioned to carry data and one or more control messages for routing update and resource allocation update;
   b. receiving IP addresses of UEs associated with the second mesh application system via the IP tunnel;
   c. storing, at the first mesh node, received IP addresses in (b) associated with the second mesh application system along with IP addresses of UEs associated with the first mesh application system;
   d. routing IP traffic between a first UE associated with the first mesh node and a second UE associated with the neighboring, second, mesh node via the IP tunnel;
   e. periodically exchanging the resource allocation update control messages between the first and second mesh application systems via a control channel within the IP tunnel to coordinate resource assignment to backhaul wireless link and UEs between the first and second mesh nodes;
   f. giving periodical decisions on assignment of frequency sub-bands to radio access UEs of the first, local, mesh node not reserved/used for backhaul UEs and assigned to radio access UEs of the second mesh node; and g. giving periodical decisions on assignment of frequency sub-bands to backhaul UEs based on combination/summary of messages received from the second, remote mesh node by avoiding in-use backhaul frequency sub-bands.

4. The method of claim 3, wherein said step of receiving IP addresses is performed by getting notified about connected, disconnected, handed-over, and handed in UEs in the neighboring, second, mesh node.

5. The method of claim 3, wherein said received IP addresses are identified by sniffing packets coming from a Backhaul UE and a Core Network at the first mesh node attached to the first mesh application system.

6. The method of claim 3, wherein the control channel assigns frequency sub-bands for the backhaul UEs in uplink and downlink directions fully duplex by using a statically or dynamically reserved group of frequency sub-bands for backhaul only.

7. The method of claim 3, wherein the control channel assigns frequency sub-bands for the backhaul UEs by using a sub-band assignment numbering method using sub-band numbering or a binary bitmap of assigned spectrum.

8. The method of claim 6, wherein the method further comprises determining a number of frequency sub-bands to be used for backhaul traffic by static assignment or dynamic assignment based on one more of the following: backhaul data capacity need, Quality of Service (QoS) characteristics of UEs, and node's position in the network.

9. The method of claim 3, wherein best available frequency bands are computed by the first mesh application system for its radio access and backhaul UEs if dynamic resource partitioning is active.

10. A non-transitory, computer accessible memory medium storing program instructions for performing a method as implemented in a first mesh application system placed within a first mesh node of a wireless mesh network, wherein the program instructions are executable by a processor to:

a. form an IP tunnel to at least a second mesh application system in a neighboring, second, mesh node using a wireless backhaul link, the IP tunnel provisioned to carry data and one or more control messages for routing update and resource allocation update;

b. receive IP addresses of UEs associated with the second mesh application system via the IP tunnel;

c. store, at the first mesh node, received IP addresses in (b) associated with the second mesh application system along with IP addresses of UEs associated with the first mesh application system;

d. route IP traffic between a first UE associated with the first mesh node and a second UE associated with the neighboring, second, mesh node via the IP tunnel;

e. periodically exchange the resource allocation update control messages between the first and second mesh application systems via a control channel within the IP tunnel to coordinate resource assignment to backhaul wireless link and UEs between the first and second mesh nodes;

f. give periodical decisions on assignment of frequency sub-bands to radio access UEs of the first, local, mesh node not reserved/used for backhaul UEs and assigned to radio access UEs of the second mesh node; and g. give periodical decisions on assignment of frequency sub-bands to backhaul UEs based on combination/summary of messages received from the second, remote mesh node by avoiding in-use backhaul frequency sub-bands.

11. The non-transitory, computer accessible memory medium of claim 10, wherein, in (b), receive IP addresses of UEs is performed by getting notified about connected, disconnected, handed-over, and handed in UEs in the neighboring, second, mesh node.

12. The non-transitory, computer accessible memory medium of claim 10, wherein the received IP addresses are identified by sniffing packets coming from a Backhaul UE and a Core Network at the first mesh node attached to the first mesh application system.

13. The non-transitory, computer accessible memory medium of claim 10, wherein the control channel assigns frequency sub-bands for the backhaul UEs in uplink and downlink directions fully duplex by using a statically reserved group of frequency sub-bands for backhaul only.

14. The non-transitory, computer accessible memory medium of claim 10, wherein the control channel assigns frequency sub-bands for the backhaul UEs by using a sub-band assignment numbering method using sub-band numbering or a binary bitmap of assigned spectrum.

15. The non-transitory, computer accessible memory medium of claim 10, wherein the method further comprises determining a number of frequency sub-bands to be used for backhaul traffic by static assignment or dynamic assignment based on one more of the following: backhaul data capacity need, Quality of Service (QoS) characteristics of UEs, and node's position in the network.

* * * * *